United States Patent
Uphus et al.

(10) Patent No.: US 6,974,243 B2
(45) Date of Patent: Dec. 13, 2005

(54) SCREW ELEMENT FOR SAME-SENSE ROTATING MULTI-SCREW EXTRUDERS

(75) Inventors: Reinhard Uphus, Hannover (DE); Matthias Nolting, Hameln (DE)

(73) Assignee: Berstorff GmbH, Hannover (DE)

( * ) Notice: Subject to any disclaimer, the term of this patent is extended or adjusted under 35 U.S.C. 154(b) by 188 days.

(21) Appl. No.: 10/472,734

(22) PCT Filed: Mar. 8, 2002

(86) PCT No.: PCT/DE02/00901

§ 371 (c)(1),
(2), (4) Date: Sep. 19, 2003

(87) PCT Pub. No.: WO02/076707

PCT Pub. Date: Oct. 3, 2002

(65) Prior Publication Data

US 2004/0114455 A1 Jun. 17, 2004

(30) Foreign Application Priority Data

Mar. 22, 2001 (DE) .......................................... 101 14 727

(51) Int. Cl.⁷ .............................. B29B 7/38; B29B 7/48
(52) U.S. Cl. ............................. 366/79; 366/85; 366/88; 366/89
(58) Field of Search .............................. 366/79, 83, 84, 366/85, 88, 89, 90

(56) References Cited

U.S. PATENT DOCUMENTS

| | | | | | |
|---|---|---|---|---|---|
| 3,254,367 A | * | 6/1966 | Erdmenger | ................... | 366/85 |
| 4,300,839 A | * | 11/1981 | Sakagami | ..................... | 366/85 |
| 5,048,971 A | * | 9/1991 | Wall et al. | ..................... | 366/85 |
| 5,573,332 A | * | 11/1996 | Weihrich et al. | .............. | 366/85 |
| 6,062,719 A | * | 5/2000 | Busby et al. | .................. | 366/85 |
| 6,116,771 A | * | 9/2000 | Andersen | ..................... | 366/79 |

FOREIGN PATENT DOCUMENTS

DE        42 39 220        * 5/1994

* cited by examiner

*Primary Examiner*—Tony G. Soohoo
(74) *Attorney, Agent, or Firm*—Cohen, Pontani, Lieberman & Pavane

(57) ABSTRACT

A screw element includes an outer radius $R_a$ and a core radius $R_i$ for multiscrew extruders with co-rotating and intermeshing screw shafts. The screw element has in axial cross section through its longitudinal axis a profile which has at each of the two axial end faces (i.e. a front end face and a rear end face) only one screw flight corresponding to a conventional single-start screw element for intermeshing screw shafts. In this case, the width (flight land angle φ) of the screw flight and conversely, in a corresponding way, the width (flight land angle φ) of the screw flight are formed in a special way and a shearing flight with a constant shearing flight radius $R_s$, which is greater than $R_i$, and less than $R_a$, is provided.

10 Claims, 15 Drawing Sheets

SCREW ELEMENT FOR SAME-SENSE ROTATING MULTI-SCREW EXTRUDERS

PRIORITY CLAIM

This is a national stage of PCT application No. PCT/DE02/00901, filed on 08 Mar. 2002. Priority is claimed on that application and on the following application(s): Country: Germany, Application No.: 101 14 727.9, Filed: 22 Mar. 2001.

BACKGROUND OF THE INVENTION

1. Field of the Invention

The invention relates to a screw element with an outer radius $R_a$ and a core radius $R_f$ for multiscrew extruders with co-rotating and intermeshing screw shafts, in particular for twin-screw extruders, which has in axial cross section through its longitudinal axis a profile which has at each of the two axial end faces only a screw flight corresponding to a conventional single-start screw element for intermeshing screw shafts, the surface of which flight, between a left and a right flight edge, is part of a surface of a cylinder with the outer radius $R_a$, each end face having a circular root with the core radius $R_f$ of the screw shaft and a left and a right flank, which joins the root to the left and right flight edge, respectively.

2. Description of the Related Art

The design principles for creating screw elements for co-rotating and closely meshing multiscrew extruders, which are also referred to as Erdmenger profiles, have been known for many years. A corresponding description can be found for example in the book "Der Doppelschneckenextruder, Grundlagen und Anwendungsgebiete" [The twin-screw extruder, principles and areas of application], published by VDI Verlag GmbH, Dusseldorf, 1995 (pages 10–30). In the illustration 1.4 (page 14) of this publication there is shown, for example, an axial cross section of the profile of a single-start screw element of the type mentioned at the beginning.

For the dispersive and distributive mixing of additives, for example, or other components into plastic compositions, usually kneading blocks which comprise a plurality of kneading disks with an Erdmenger profile, arranged axially one behind the other and offset angularly with respect to one another, are used. The kneading disks are respectively arranged in pairs, lying opposite one another on the two screw shafts of the respective twin-screw extruder, and closely intermesh. The mixing process in conventional kneading blocks is to be regarded as a random process, i.e. the mixing work performed in individual volume elements varies in intensity. Therefore, to achieve a high degree of homogeneity of the mixture, considerable mechanical energy has to be expended to ensure that, as far as possible, every volume unit also undergoes shearing. On the basis of an individual kneading disk, a relatively small proportion of the material to be handled is in each case sheared extremely intensely, while by far the greatest part of the material evades the shearing gap between the shearing disk and the barrel wall and is consequently sheared only little. For this reason, to ensure a high degree of homogeneity of the mixture, either very long kneading blocks of the known type or else high rotational speeds are required. In any event, considerable mechanical energy is expended and is introduced in the form of heat into the material to be handled. In particular during the processing of rubber mixes, the generation of relatively large amounts of heat is extremely undesirable.

DE 42 39 220 A1 discloses a twin-screw extruder with two identical, closely meshing and co-rotationally driven screw shafts, which are arranged in the bores of a shared barrel. The screw shafts are provided with kneading disks, which have a three-start shaft cross section, that is to say have three flight lands. The distance of the flight lands from the inner surface of the barrel bore and the width of the flight lands vary. The flight land with the greatest flight land width has in this case the smallest distance from the inner surface of the barrel bore. The screw elements known from this document are of a three-start form over their entire axial length.

SUMMARY OF THE INVENTION

The object of the present invention is to develop a screw element of the generic type to the extent that, with the same homogenizing result, a much smaller amount of energy is introduced into the material to be handled.

This object is achieved according to the present invention in the case of a screw element of the generic type by the features specified in the defining part of patent claim 1. Advantageous developments of the invention emerge from the dependent claims.

The screw element according to the invention has in cross section through its longitudinal axis a front and a rear end face, which corresponds in its shape to that of a single-start screw element for intermeshing screw shafts of multiscrew extruders. As a result, this screw element can be combined without any problems whatsoever with corresponding conventional single-start screw elements for co-rotating and intermeshing screw shafts on a shared screw shaft. The profile geometry of the screw element is preferably designed for close meshing of the screw elements. In this case, the play between the screw elements and the inner wall of the extruder barrel and between one another, necessary for technical production-related reasons, is usually in the dimensional range of just a few tenths of a millimeter. However, the success according to the invention can also be achieved in significant part if a greater play (in the range of up to several millimeters, for example 1–5 mm, depending on the barrel diameter) is chosen and the screw elements cannot touch one another, that is to say do not closely mesh in the strict sense.

To avoid misunderstandings, it should be pointed out that the following statements respectively relate to a pair of screws rotating to the right in the direction of the process.

Over the axial length between the front end face and the rear end face, the shape of this screw element significantly deviates, however, from the known geometry of single-start screw elements, but without losing the property of intermeshing or closely meshing. As it proceeds from the front end face and the flight edge opposite to the rotational sense of the screw element (in the case of rotation to the right, that is to say starting from the left flight edge) along the longitudinal axis up to a partial length x of the axial length l of the screw element, the width of the screw flight (flight land angle) is reduced down to 0 to form an edge. The distance of this edge from the longitudinal axis is initially reduced with increasing distance from the front end face and then increases again, however, until this edge ends in the flight edge corresponding to the rotational sense of the screw element (in the case of rotation to the right, that is to say in the right flight edge) at the rear end face. Conversely, in a corresponding way, as it proceeds from the rear end face and the flight edge corresponding to the rotational sense (in the case of rotation to the right, that is to say the right flight edge) along the longitudinal axis up to a partial length x of the axial length l of the screw element, the width of the screw flight is reduced down to 0 to form an edge, the distance of which from the longitudinal axis is then initially reduced and subsequently, as the distance of the flight surface from the longitudinal axis increases again, ends in the flight edge opposite to the rotational sense of the screw element (in the case of rotation to the right, that is to say the left flight edge) at the front end face. Consequently, instead of having a single flight with a constant flight width and constant distance of the flight surface from the longitudinal axis, this screw element has two flight elements running symmetrically in relation to each other with respect to the longitudinal axis, which in one portion have in each case a constant flight radius as the flight width (flight land angle) decreases and in a further portion have a flight width of 0 (i.e. formation of an edge) and a distance from the longitudinal axis that varies along the longitudinal axis. In addition, however, the screw element according to the invention is also characterized by a further flight, that is a shearing flight. This shearing flight has a shearing flight radius $R_s$, i.e. a distance from the longitudinal axis of the screw element which is greater than the core radius $R_i$ and less than the outer radius $R_a$. The shearing flight extends from that point on the flank corresponding to the rotational sense of the screw element (in the case of rotation to the right, that is to say the right flank) of the front end face, which has the distance Rs from the longitudinal axis, and proceeds in a helical form corresponding to the rotational sense of the screw element to the flank opposite to the rotational sense of the screw element (in the case of rotation to the right, that is to say the left flank) of the rear end face. The shearing flight comprises in its axial length an axial middle piece of substantially constant flight width (i.e. constant flight land angle) and in each case a transitional piece from the middle piece to the front and rear end face, respectively. In these transitional pieces, the flight width is in each case reduced as it increasingly approaches the end face, preferably continuously down to 0 to form an edge, which at the respective end face ends in the flank.

The described profile of the shearing flight is in principle designed such that it acts in a backward-conveying sense on the material to be handled. This characteristic can be significantly influenced, however, if the shape of the screw element is superposed with an additional pitch, at least over part of its axial length, in that the shape of the screw element is twisted, that is to say cross sections lying one behind the other are turned with respect to one another. On the basis of the axial length of one portion of the screw element, the magnitude of the twisting can, if required, be chosen differently in individual portions. To intensify the backward-conveying effect of the shearing flight, the additional pitch can be brought about by twisting the cross section with respect to the front end face in the direction of the intended rotational direction of the screw element. A reduction in the backward-conveying effect, or even reversal into an especially advantageous forward-conveying effect, can be achieved by the additional pitch being brought about by twisting the cross section with respect to the front end face in the direction counter to the intended rotational direction of the screw element. This embodiment is particularly preferred within the scope of the present invention.

The additional pitch is expediently superposed on the screw element over its entire length. It is also possible, however, to superpose different additional pitches on a plurality of portions of the screw element lying axially one behind the other.

The action of the screw element according to the invention is such that the material conveyed by the respective multiscrew extruder is drawn into a screw channel, that is to say into the respective cavity between the screw element and the extruder barrel surrounding the screw element, which is bounded by a shearing flight in the sense of a barrier and the cross-sectional volume of which in the conveying direction is reduced to 0, so that the material is forced in its entirety over the shearing flight. Consequently, a defined shearing and stretching takes place for each volume element of the material to be handled. No special back-pressure elements are required to ensure adequately thorough mixing. Therefore, an extruder system equipped with the screw element according to the invention can be readily run empty. Added to this is the fact that the profile of this screw element according to the invention is self-cleaning if it is designed as a closely meshing screw element. On account of these properties, material changes and also color changes can be accomplished particularly quickly and with minimal effort in the case of an extruder system equipped with the screw elements according to the invention.

BRIEF DESCRIPTION OF THE DRAWINGS

In the drawings, wherein like reference characters denote similar elements throughout the several views:

FIG. 1b is a perspective view from the front right of a surface model of the screw element of a FIG. 1a;

FIG. 2a is a perspective view from the front left of a wire model of the screw element of FIG. 1a;

FIG. 2b is a perspective view from the front left of a surface model of a screw element of FIG. 1a;

FIG. 3 is a side view of a wire model of the screw element of FIG. 1a;

FIG. 11b is a perspective view from the front left of a surface model of the screw element in FIG. 11a; and FIG. 12 is a perspective view from right of a surface model of the screw element of FIG. 11a.

DETAILED DESCRIPTION OF THE PRESENTLY PREFERRED EMBODIMENTS

Figure 1A:
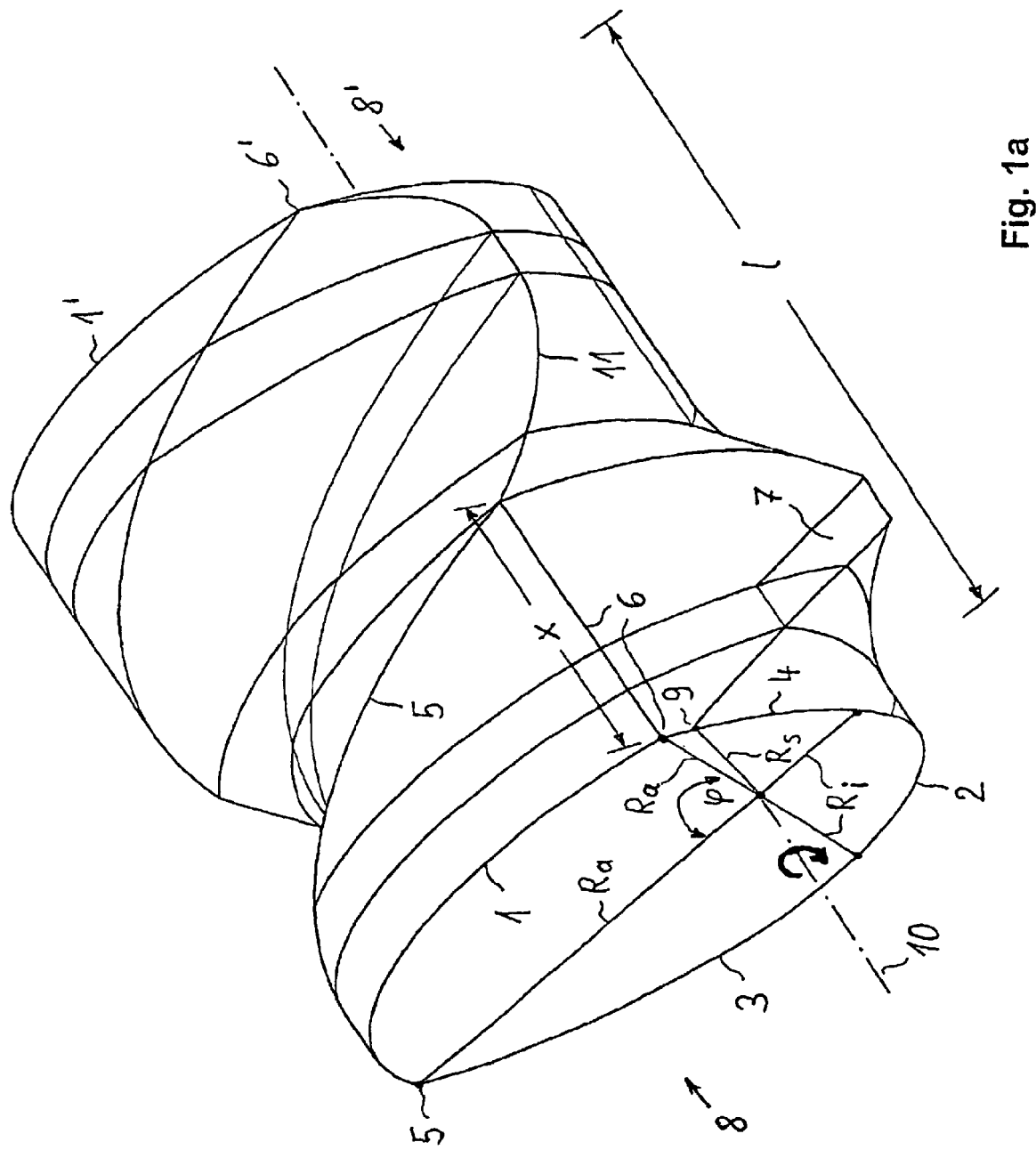
FIG. 1a is a perspective view from the front right of a wire model of a screw element according to the invention.
Figure 1B:
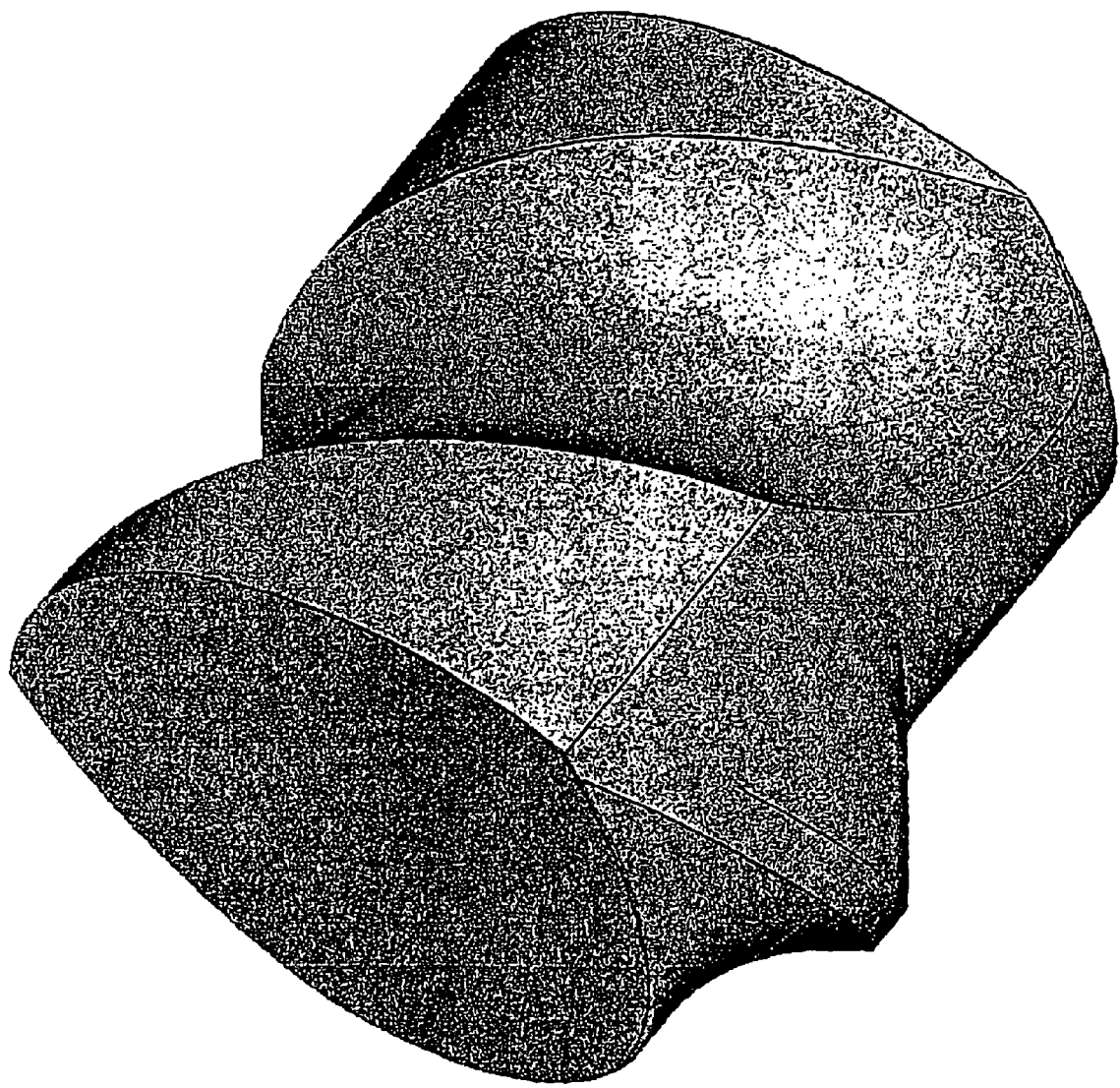
Figure 2A:
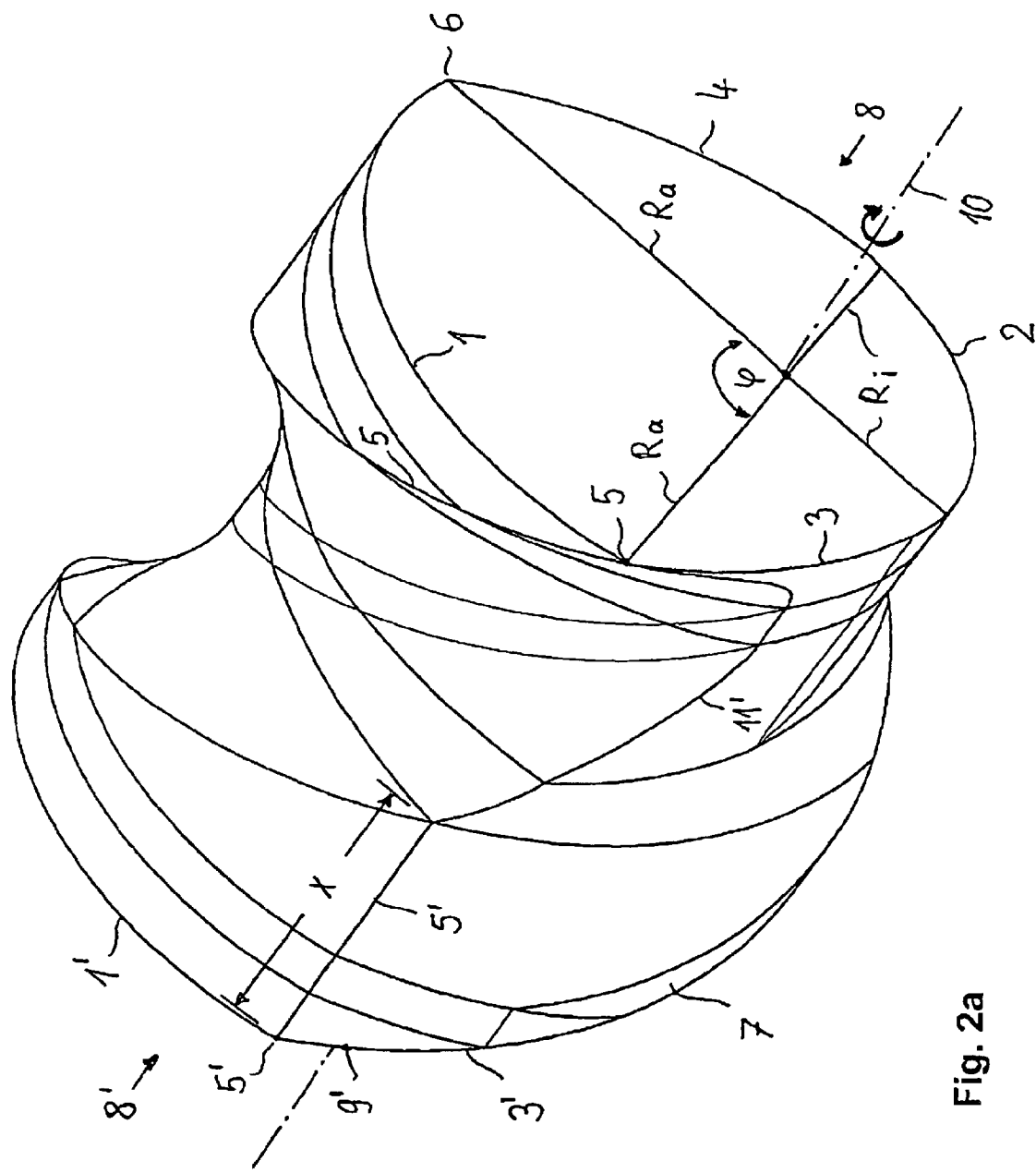
Figure 2B:
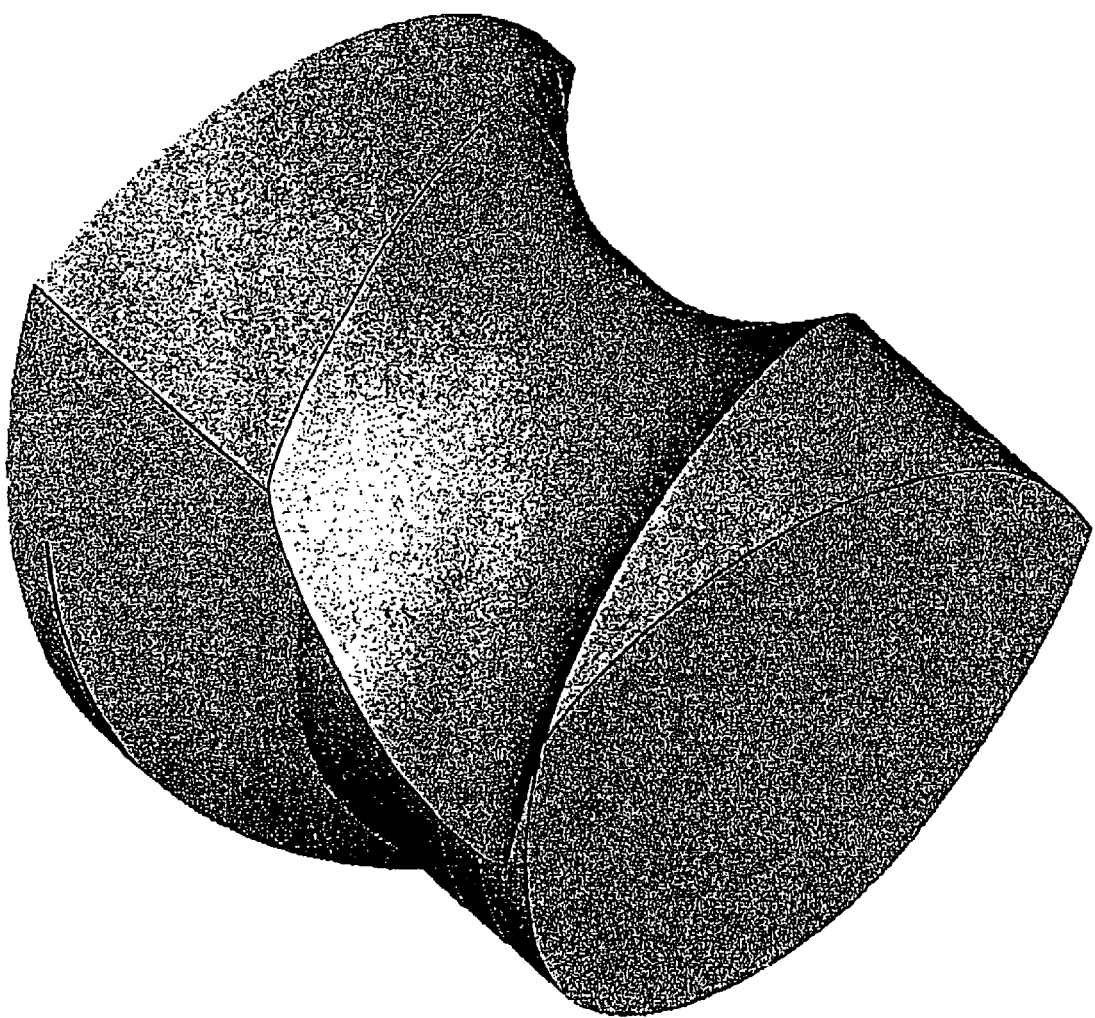

The screw element according to the invention, shown in FIGS. 1 and 2 in a perspective view from the front right and the front left, respectively (in FIG. 1a and FIG. 2a as a wire model and in FIG. 1b and FIG. 2b as a surface model) is intended for a right-turning screw shaft, as indicated by the thick arrow entered on the front end face 8. The profile of the end face 8 in the chosen exemplary embodiment is that of a closely meshing single-start Erdmenger screw element. The longitudinal axis 10 of the screw element has an axial length 1. Between the points 5, 6, which are also referred to as flight edges, extends the flight 1, which has a surface in the form of a cylinder shell and is formed in the end section as an arc of a circle with the radius $R_a$ about the center point defined by the longitudinal axis 10. The flight width is defined by the flight land angle ϕ, which is formed between the two radii $R_a$ passing through the left and right flight edges 5, 6, respectively. Diametrically opposite the flight 1 lies the root 2, which likewise has a shape in the form of a cylinder shell and is therefore circular in end section. The radius of the root is denoted by $R_i$ and corresponds to the core diameter of the associated screw shaft (core radius $R_i$). In the circumferential direction, the root 2 of the end face 8, in a way similar to the flight 1, extends over an angle ϕ. Between the flight 1 and the root 2 lie two flanks 3, 4, which in the end face 8 respectively correspond to an arc of a circle with the radius $R_a+R_i$. The circle center point for the flank 4 lies on the opposite left flight edge 5, while the center point of the left flank 3 lies on the opposite right flight edge 6. In principle, it is possible to choose the flight land angle ϕ for the flight 1 to be different from the flight land angle for the root 2. In this case, however, the mating element meshing with the respective screw element would have to have a correspondingly complementary, different shape. In particular for technical production-related reasons, it is recommendable to choose the two flight land angles to be the same, as in the exemplary embodiment represented according to FIG. 1, in order to allow in each case 2 identical screw elements to intermesh.

The rear end face 8', lying opposite the front end face 8, has an entirely identical profile shape. To differentiate from the points or profile lines of the front end face 8, the corresponding points and profile lines of the rear end face 8' are identified by the same numbering with an additional prime, as revealed by FIGS. 1 and 2. The latter shows the screw element from FIG. 1 in a perspective view from the front left. Between the two end faces 8, 8', the screw element has the following shape: in the axial direction from the front end face 8 to the rear end face 8', the width of the flight 1 decreases down to the value 0 as it proceeds from the left flight edge 5 up to an axial partial length x. At the point of the partial length x, both flight edges 5, 6 consequently coincide to form a point and then continue in a common edge 11, which ends in the right flight edge 6' of the rear end face 8'. The distance of the edge 11 from the longitudinal axis 10 in this case initially decreases over a further part of the axial length and then increases again up to the original value $R_a$ at the point 6'. Conversely, in a corresponding way, as it proceeds from the right rear flight edge 6' in the direction of the front end face 8, the flight width 1' decreases to the value 0 by the time it reaches an axial partial length x. There, the two flight edges 6' and 5' again coincide at a point and continue in an edge 11' until the left flight edge 5 in the front end face 8 is reached. The edge 11' has a profile corresponding to the edge 11, that is to say, as it increasingly approaches the end face 8, it initially reduces its distance from the longitudinal axis 10, starting from the original value $R_a$, over a certain part of the axial length and, after that, increases again up to the original value $R_a$. In addition to the two flight elements similar to each other in the form of the flight 1 and the edge 11 or the flight 1' and the edge 11', the screw element according to the invention also has a third flight element in the form of a shearing flight 7, which extends at a constant distance (shearing flight radius $R_s$) from the longitudinal axis 10 as it proceeds from the right flank 4 at the front end face 8 in the direction of rotation intended for the screw element according to the invention (that is to say right-rotating here) up to a corresponding point 9' on the left flank 3' at the rear end face 8'. The flight width (measured as the shearing flight land angle from the longitudinal axis 10, not represented in FIGS. 1 and 2) is constant in a middle portion of the axial length l. However, the latter is not absolutely necessary. Between the front end face 8 and the rear end face 8', the middle piece of the shearing flight 7 respectively continues in a transitional piece up to the two end faces 8, 8'. In this transitional piece, the distance (shearing flight radius $R_s$) from the longitudinal axis 10 remains constant in each case. As it proceeds from the respective end face 8, 8', the shearing flight 7 initially has the width 0 over a first axial part, that is to say is an edge, and widens in a second axial part from 0 up to the shearing flight width of the middle piece of the shearing flight 7.

Figure 3:
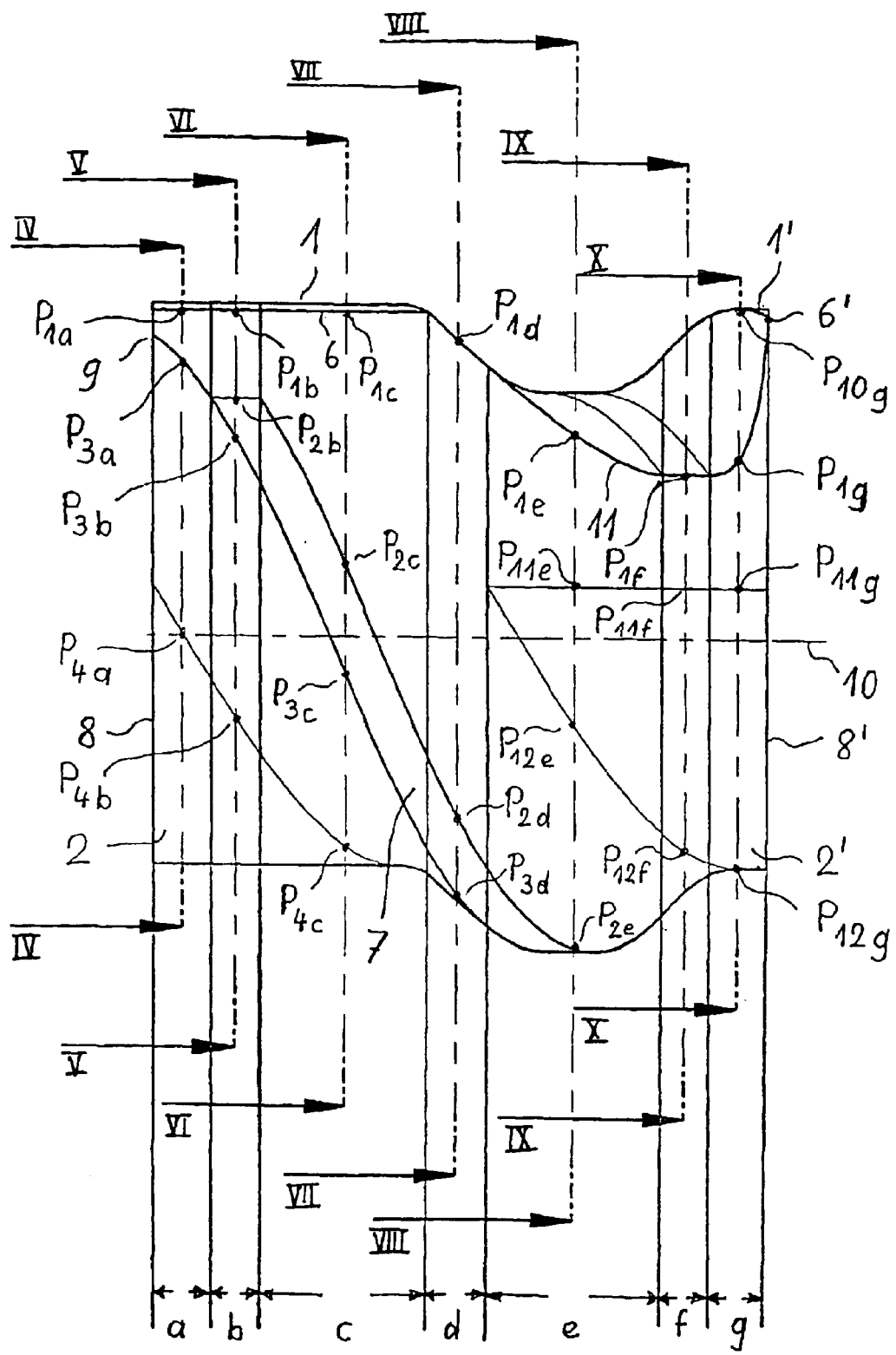

FIG. 3 shows the screw element according to the invention in a side view. Over the axial length 1, this screw element is divided into parts, the axial lengths of which are identified by the letters a–g. In the chosen exemplary embodiment, the axial lengths of the parts a and g, b and f, c and e are the same as one another in pairs. A total of 7 sections, which are denoted by the letters IV—IV to X—X, have been taken through the individual parts, in each case transversely with respect to the longitudinal axis 10. These 7 sections are specifically represented in FIGS. 4 to 10. Comparable salient points of the cross sections are respectively identified by P and a consistent numerical index. To differentiate the individual sections, the numerical index is supplemented by an additional lower-case letter (for example a) corresponding to the respective section. By comparison of the individual sections, the profiles of the flight elements, which are likewise specified in a way corresponding to the identification from FIGS. 1–3, can be specifically followed. Table 1 provides the particulars of parameters for the individual arcs of circles in relation to each of the 7 profile sections (corner points, radius, center point), from which the profile sections IV—IV to X—X are respectively made up, so that it is possible to dispense with a detailed verbal description.

FIG. 3 shows the screw element according to the invention in a side view. Over the axial length 1, this screw element is divided into parts, the axial lengths of which are identified by the letters a–g. In the chosen exemplary embodiment, the axial lengths of the parts a and g, b and f, c and e are the same as one another in pairs. A total of 7 sections, which are denoted by the letters IV—IV to X—X, have been taken through the individual parts, in each case transversely with respect to the longitudinal axis 10. These 7 sections are specifically represented in FIGS. 4 to 10. Comparable salient points of the cross sections are respectively identified by P and a consistent numerical index. To differentiate the individual sections, the numerical index is supplemented by an additional lower-case letter (for example a) corresponding to the respective section (for example IV—IV). By comparison of the individual sections, the profiles of the flight elements, which are likewise specified in a way corresponding to the identification from FIGS. 1–3, can be specifically followed. Table 1 provides the particulars of parameters for the individual arcs of circles in relation to each of the 7 profile sections (corner points, radius, center point), from which the profile sections IV—IV to X—X are respectively made up, so that it is possible to dispense with a detailed verbal description.

Figure 4:
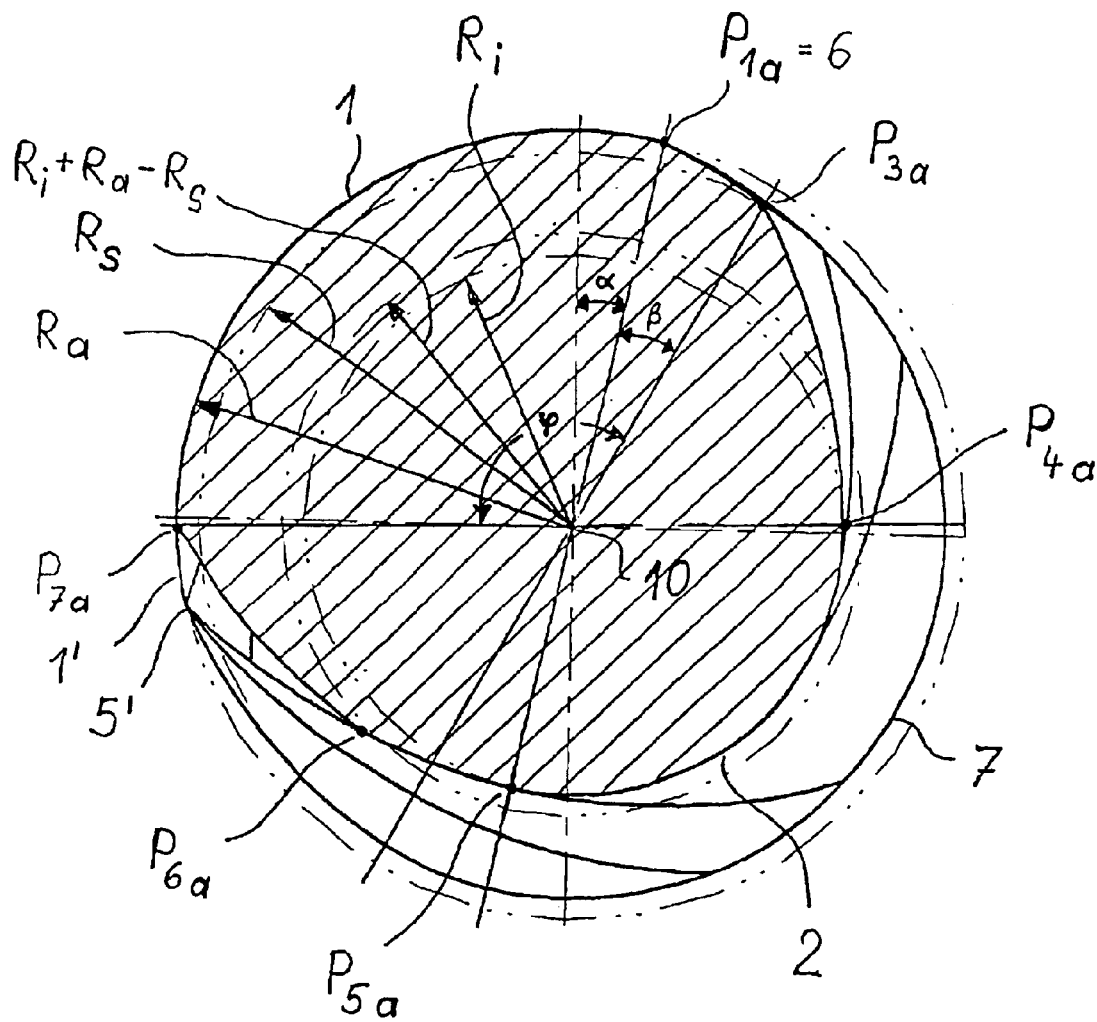
FIG. 4 is a cross-sectional view of the screw element in FIG. 3 along line IV—IV.

In FIG. 4 the radii of four circles important for the design have been entered, that is the outer radius $R_a$, the shearing flight radius $R_s$, the core radius $R_i$, and a radius $R_i+R_a-R_s$. Furthermore, the flight land angle φ of the shearing flight 1 is indicated. The angle α denotes the angle by which the right flight edge 6 is turned about the longitudinal axis 10 (=center point of the respective profile section) with respect to the vertical. However, this angle α has no influence on the design of the profile cross section. β denotes the angle of torsion of the shearing flight 7, which is that angle by which, seen in cross section, the right flight edge of the shearing flight 7, which respectively bears the point designation $P_3$ (that is to say $P_{3a}$–$P_{3g}$), is turned with respect to the right flight edge 6 or 6' about the longitudinal axis 10. In table 2, the value which the angle β has at the start (start limiting angle) and at the end (end limiting angle) of the respective profile portion is entered for each of the profile portions a–g defined according to FIG. 3. Within the respective profile portion, the angle β changes continuously between these two limiting angles. In addition, it is also indicated in table 2 for each profile portion which value the shearing flight land angle δ respectively has in these profile portions. In the profile portions a and g, the angle δ is in each case constantly equal to 0°, i.e. the shearing flight width is 0 (edge). In the profile portions c, d and e, the shearing flight land angle is in each case at the value $δ_{set}$, i.e. there is a constant shearing flight width. In the two portions b and f, the shearing flight width or the shearing flight land angle δ respectively increases continuously from 0° to the desired value $δ_{set}$ and decreases from this value $δ_{set}$ down to 0.

Figure 5:
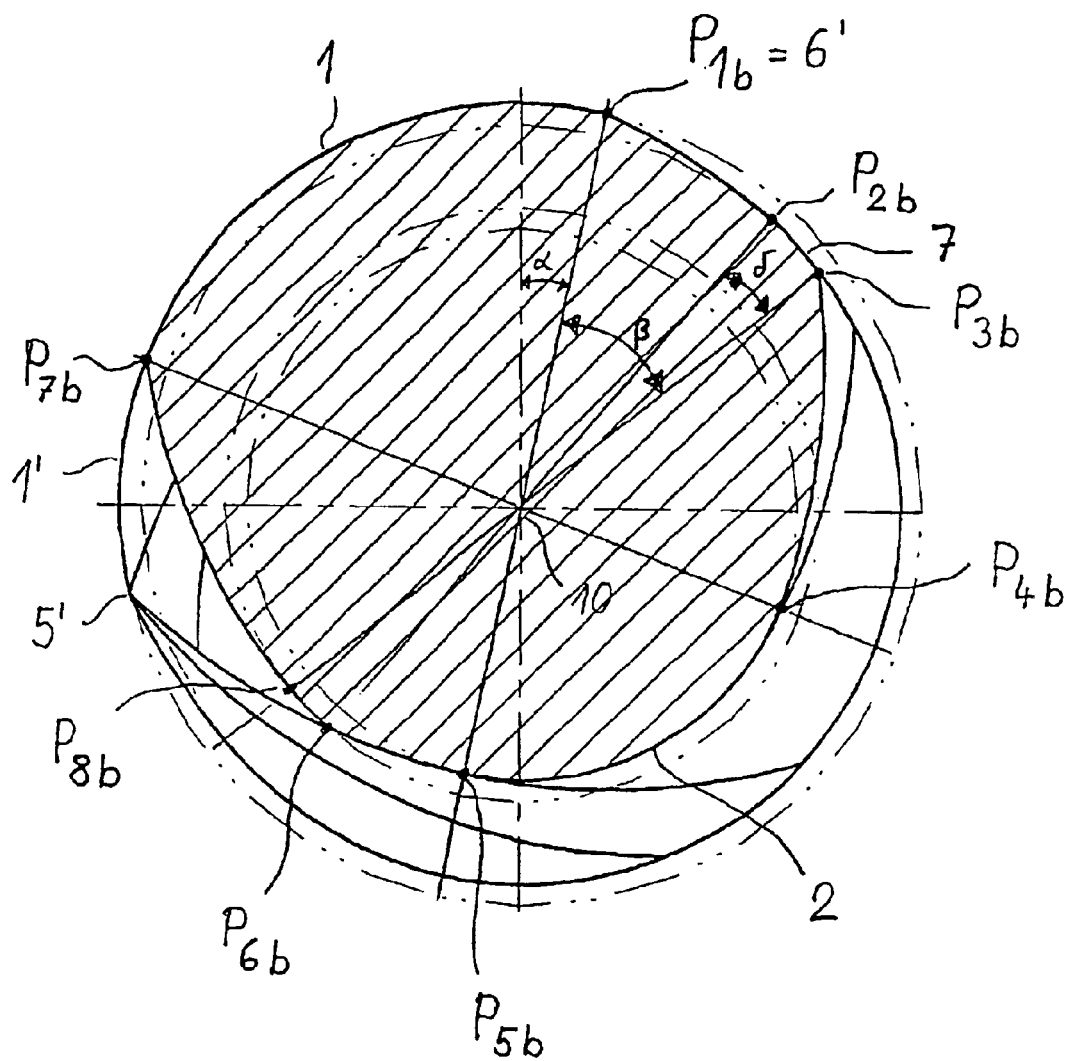
FIG. 5 is a cross-sectional view of the screw element in FIG. 3 along line V—V.
Figure 6:
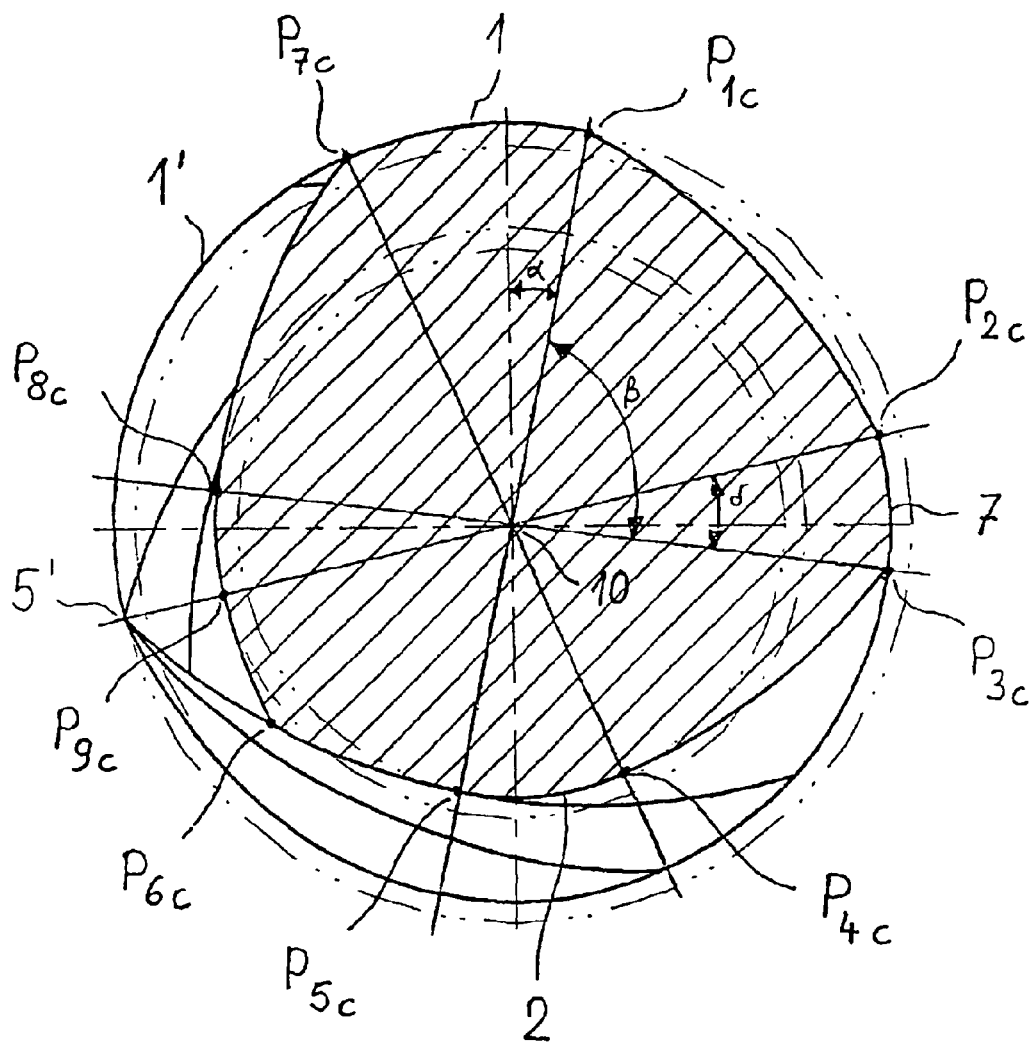
FIG. 6 is a cross-sectional view of the screw element in FIG. 3 along line VI—VI.
Figure 7:
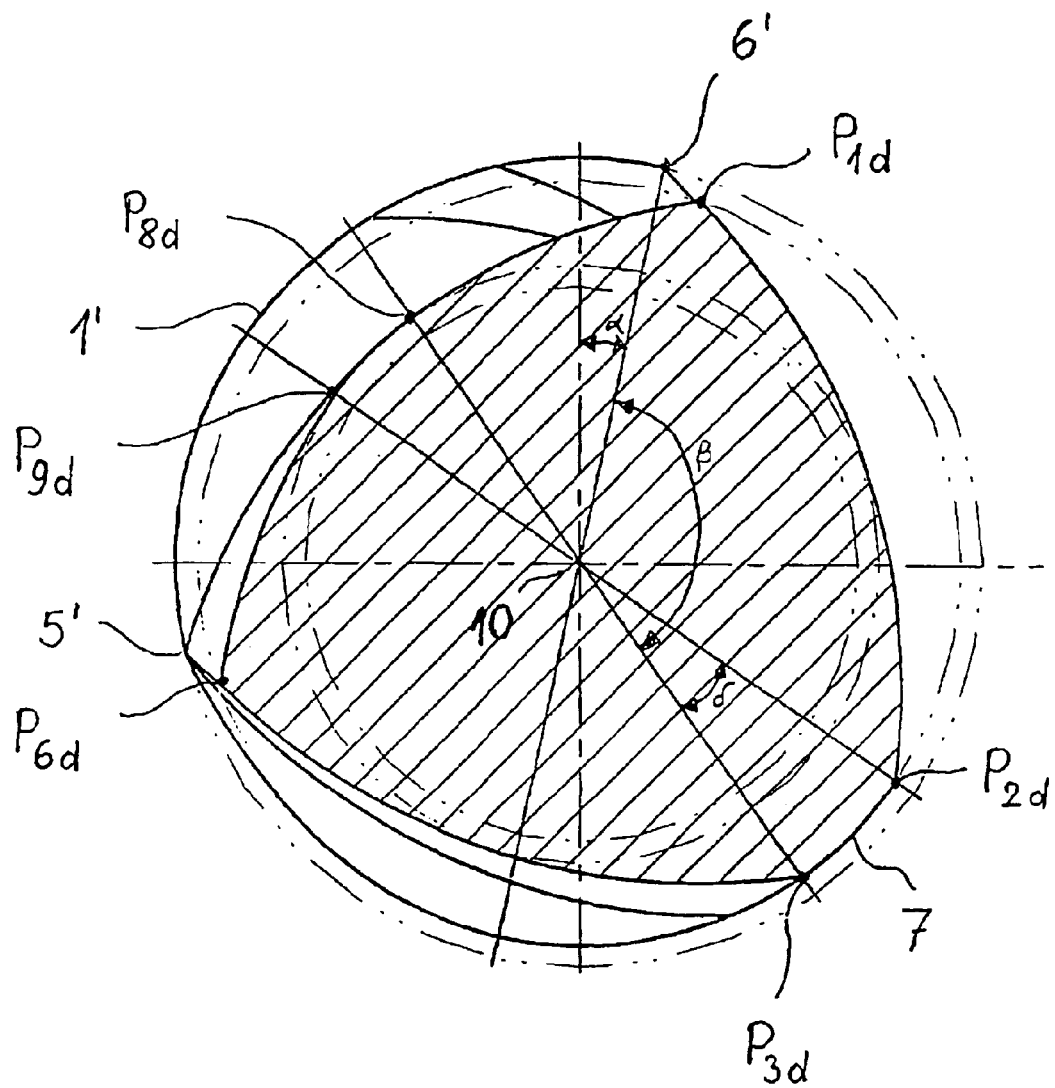
FIG. 7 is a cross-sectional view of the screw element in FIG. 3 along line VII—VII.

FIGS. 4 to 6 show that the width of the flight 1 lying between the points $P_7$ and $P_1$ significantly decreases from the section IV—IV to the section VI—VI. In FIG. 7, the flight 1 is no longer present and all that remains to be seen is the edge 11 originating from it, on which the point $P_1$ ($P_{1d}$) continues to progress (FIGS. 8–10) in the form of the points $P_{1e}$ to $P_{1g}$, until finally, at the rear end face 8', it coincides with the rear right flight edge 6' (FIG. 3). The same correspondingly applies to the flight 1', which is bounded at the rear end face 8' by the two flight edges 5' and 6' if the FIGS. 4 to 10 are considered in reverse sequence and the progression of the points $P_{10}$ ($P_{10g}$,$P_{10f}$) and $P_6$($P_{6g}$–$P_{6a}$) is followed.

Figure 8:
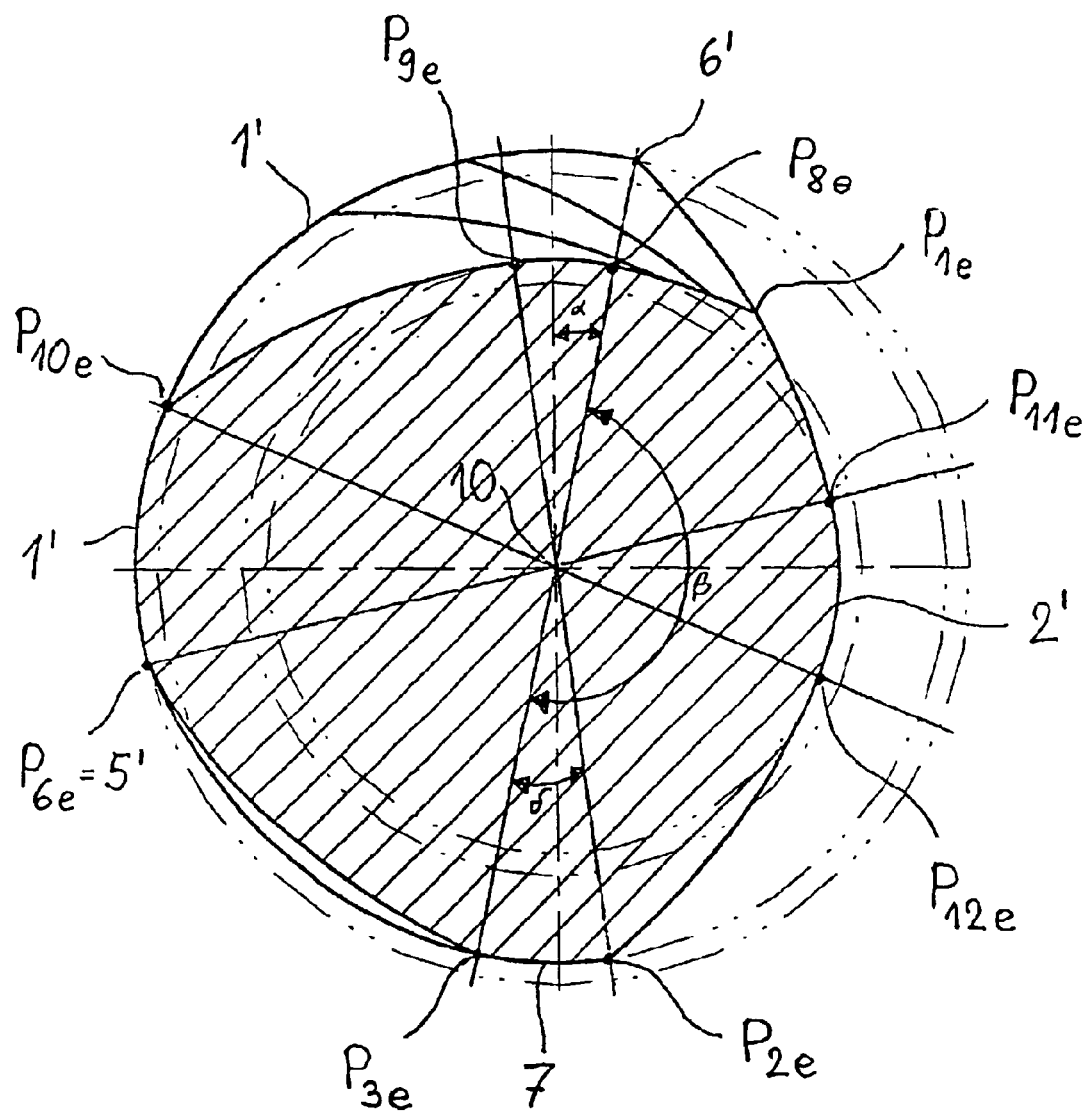
FIG. 8 is a cross-sectional view of the screw element in FIG. 3 along line VIII—VIII.
Figure 9:
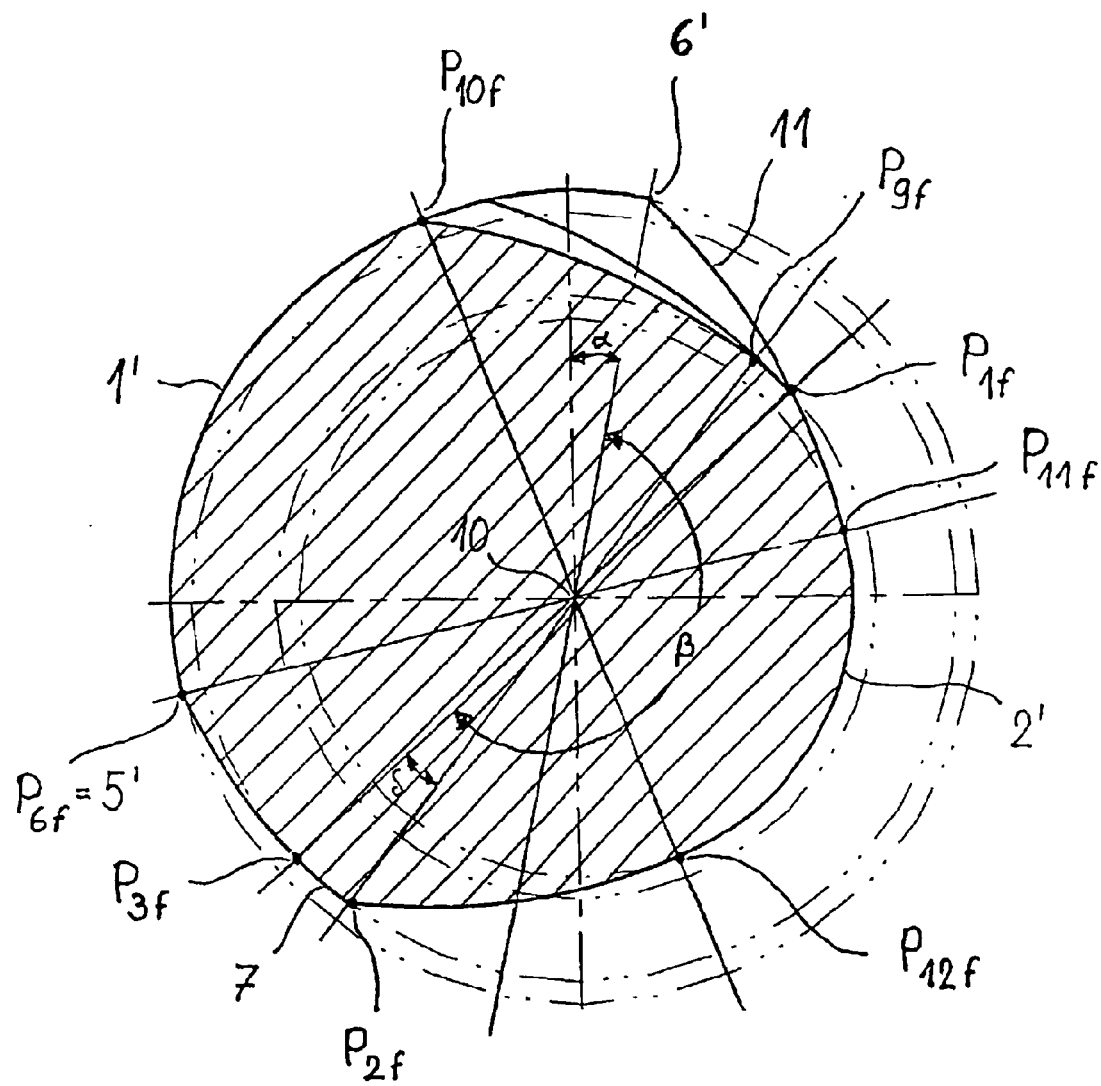
FIG. 9 is a cross-sectional view of the screw element in FIG. 3 along line IX—IX.
Figure 10:
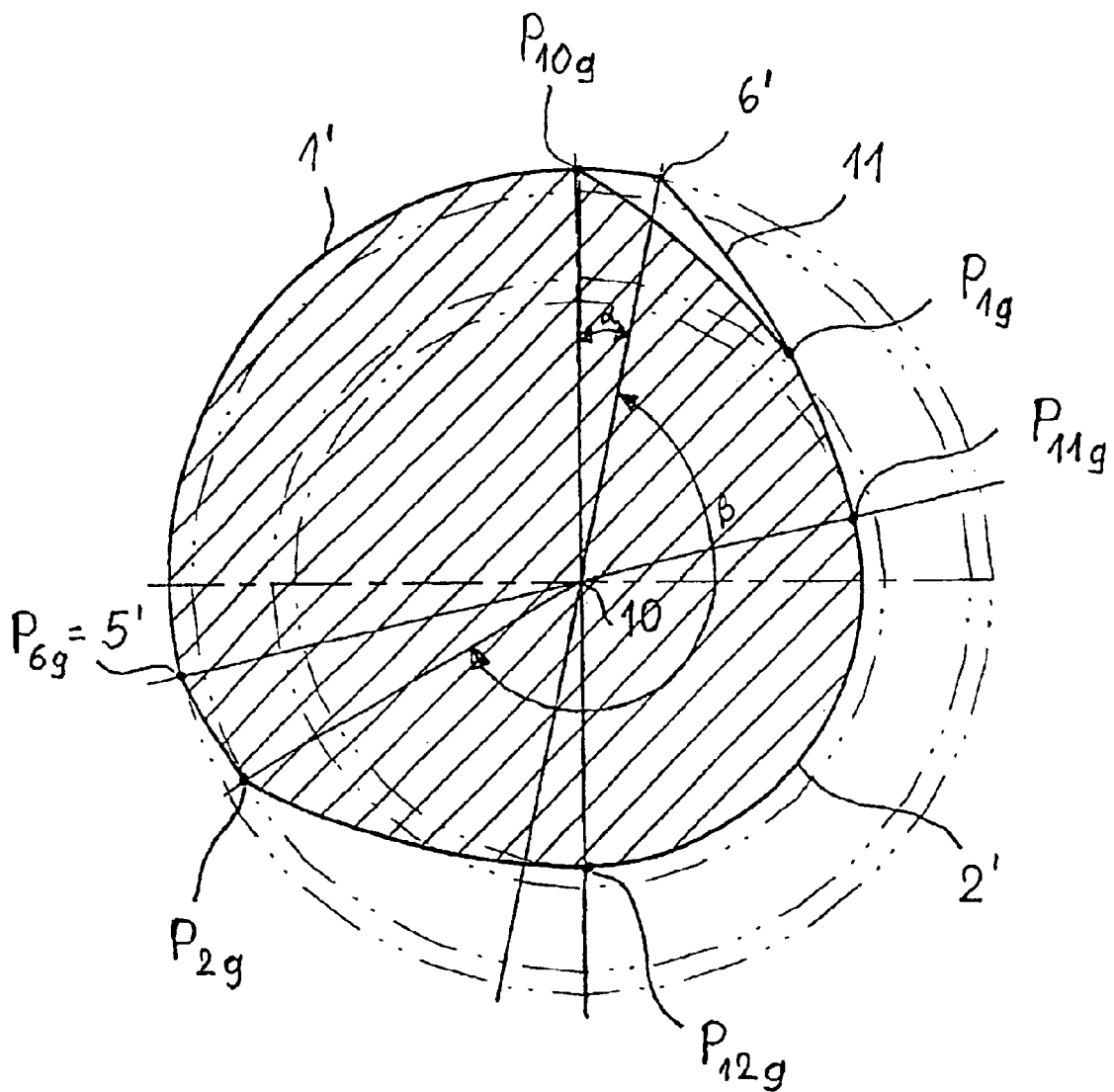
FIG. 10 is a cross-sectional view of the screw element in FIG. 3 along line X—X.

With regard to the shearing flight 7, the following can be stated: in FIG. 4, the shearing flight can only be seen in the unsectioned rear part of the flight element. In section IV—IV, the width of the shearing flight 7 is zero, that is to say it is represented only as an edge at the point $P_{3a}$. In the next figure, FIG. 5, the shearing flight 7 has already reached approximately half its setpoint value, which is indicated by the shearing flight land angle δ and is also revealed by the side view of the profile portion b in FIG. 3. The section VI—VI in FIG. 3 shows the shearing flight 7 with its full setpoint width, which extends between the points $P_{2c}$ and $P_{3c}$. This setpoint width of the shearing flight 7 also lies in the next two sections VII—VII (FIG. 7) and VII—VII (FIG. 8). In FIG. 9 (section IX—IX), the two points $P_2$ and $P_3$ move closer together again, i.e. the width of the shearing flight 7 in the form of the shearing flight land angle δ decreases again. To this extent, FIG. 9 corresponds to the representation in FIG. 5. In FIG. 10, the shearing flight 7 has again been reduced to an edge, which is represented by the point $P_{2g}$. To this extent, FIG. 10 corresponds to the representation of FIG. 4. Insofar as the individual profile points $P_1$ to $P_{12}$ from FIGS. 4 to 10 can be seen in the side view of FIG. 3, they have been entered there.

Figure 11A:
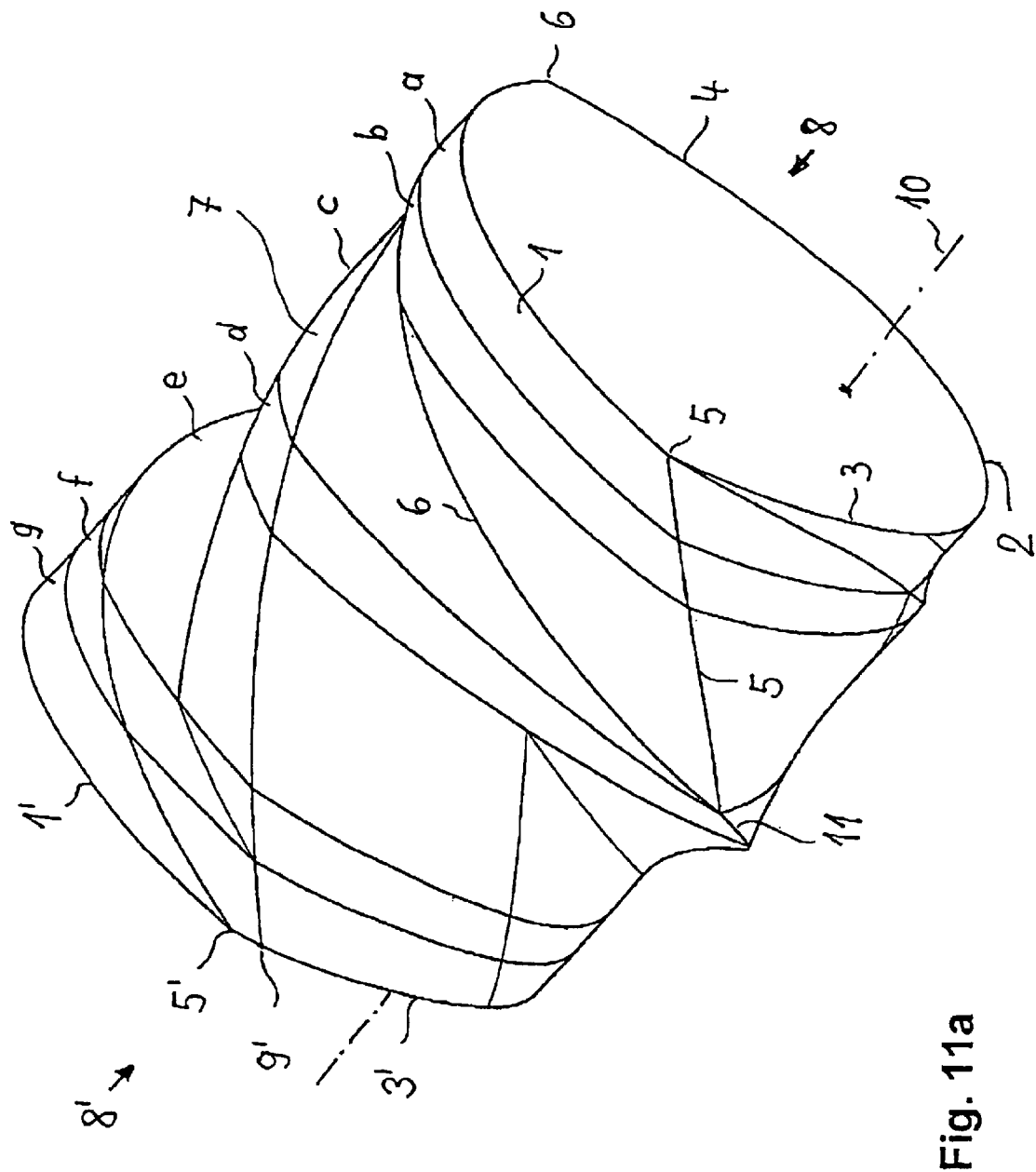
FIG. 11a is a perspective view from the front left of a wire model of another screw element according to the invention having an additionally superposed pitch.
Figure 11B:
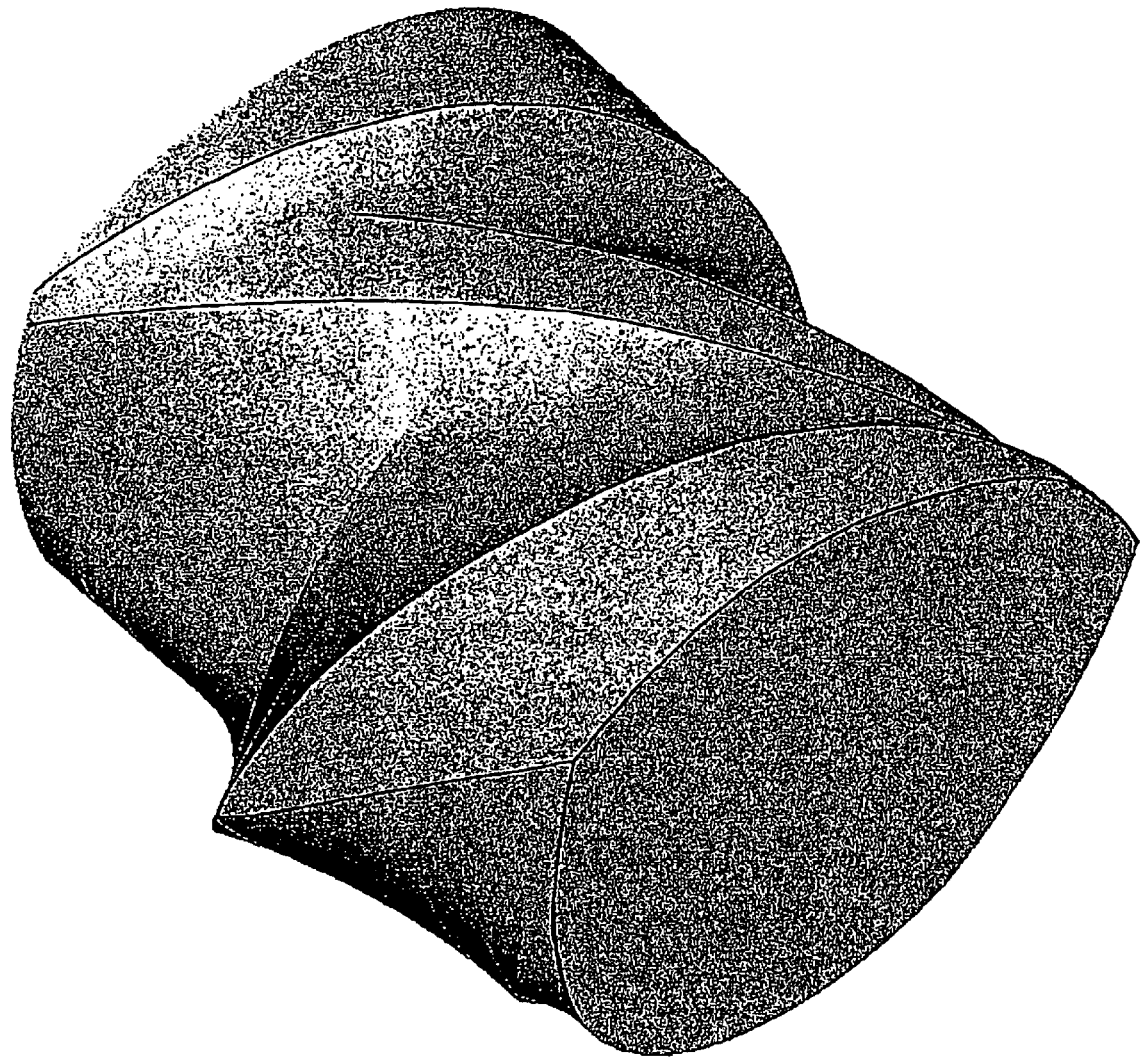
Figure 12:
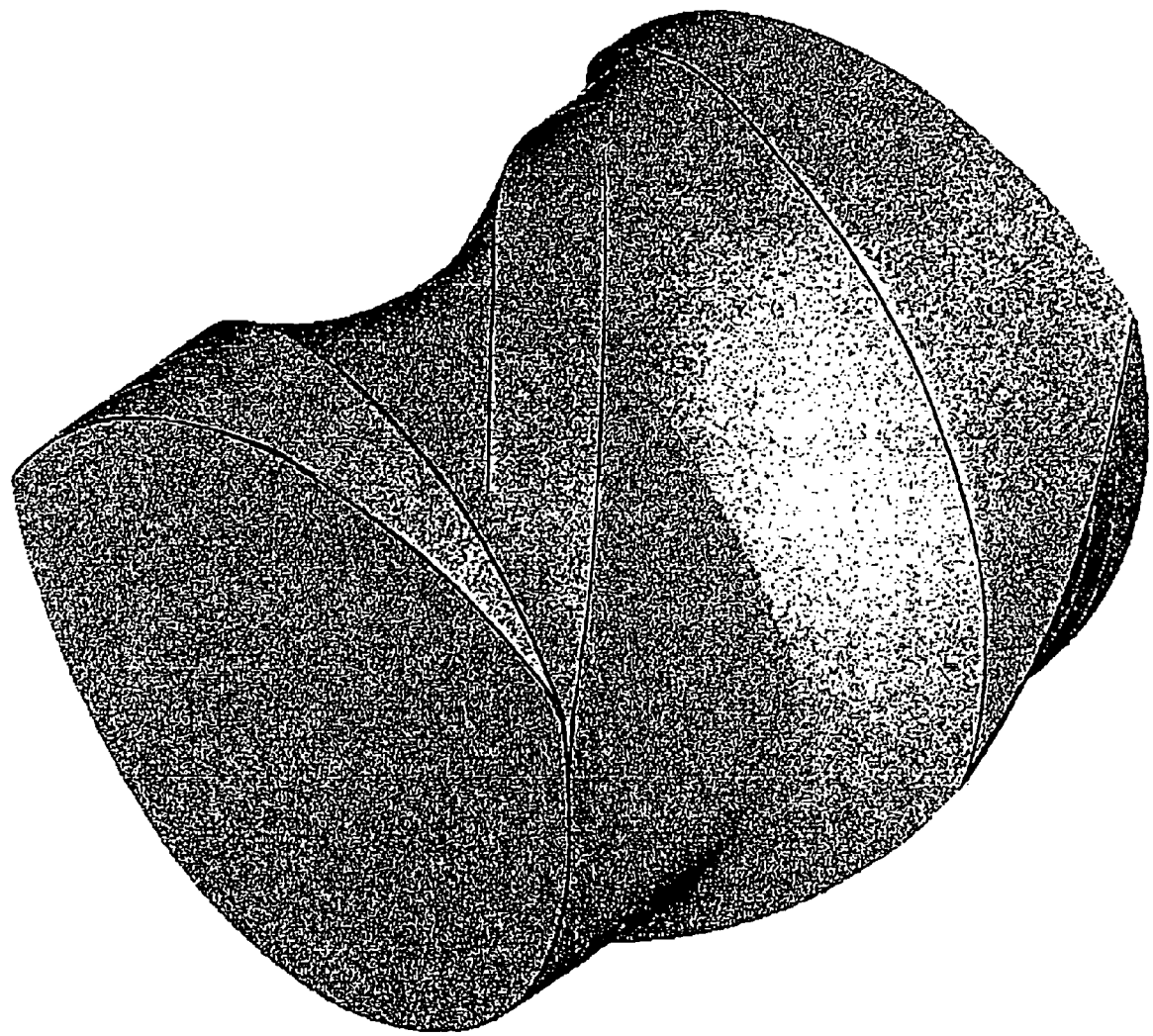

In FIGS. 11 and 12, a modification of the screw element according to FIGS. 1–3 is represented from the front left and front right, respectively (in FIG. 11a as a wire model and in FIG. 12 as a surface model). This differs only in that an additional pitch has been superposed on the screw element. In the present example, this additional pitch corresponds to a twisting by turning the profile of the rear end face 8' with respect to the front end face 8 through a turning angle of 360° counter to the intended direction of rotation of the screw profile (that is to say turning to the left). In the present case, the twisting of the profile cross section was performed uniformly over the entire axial length of the screw profile. As a result, the right flight edge no longer runs parallel to the longitudinal axis 10, as in FIG. 3, but turns with a left twist about the longitudinal axis 10. The left flight edge 5 no longer turns about the longitudinal axis 10 with a right twist, as in FIG. 2, but likewise with a left twist. The same correspondingly applies to the edge 11, in which the left and right flight edges 5, 6 continue. Furthermore, FIG. 11 shows the profile of the shearing flight 7, which no longer turns through more than 180° in a right-turning sense about the longitudinal axis 10, but now in a left-turning sense over an angle of less than 180° from the flank 4 from the proximity of the right flight edge 6 of the front end face to the left flank 3' into the proximity of the left flight edge 5' of the rear end face 8'.

In the present exemplary embodiment, a linear change of the angle β is respectively taken as a basis, that is to say a change which is proportional to the respective axial distance of a profile section from the front end face. It goes without saying that it is also possible to establish a different kind of changing increase of the angle β as a function of the axial length. The same correspondingly also applies to the increase of the angle δ from 0° to the desired setpoint value. With respect to the latter, it should be noted that this setpoint value, that is to say the shearing flight width in the axial middle region of the screw element, does not necessarily have to be strictly constant. A constant shearing flight width means a constant shearing magnitude over the axial length of the shearing flight.

TABLE 1

| Profile sections | | Parameter specification to the circular arcs of the profile sections | | | | | | | |
|---|---|---|---|---|---|---|---|---|---|
| IV-IV | Endpoints | $P_{1a}$, $P_{3a}$ | $P_{3a}$, $P_{4a}$ | $P_{4a}$, $P_{5a}$ | $P_{5a}$, $P_{6a}$ | $P_{6a}$, $P_{7a}$ | $P_{7a}$, $P_{1a}$ | | |
| | Radius | $R_a + R_i$ | $R_a + R_i$ | $R_i$ | $R_a + R_i$ | $R_a + R_i$ | $R_a$ | | |
| | Midpoint | $P_{6a}$ | $P_{7a}$ | 10 | $P_{1a}$ | $P_{3a}$ | 10 | | |
| V-V | Endpoints | $P_{1b}$, $P_{2b}$ | $P_{2b}$, $P_{3b}$ | $P_{3b}$, $P_{4b}$ | $P_{4b}$, $P_{5b}$ | $P_{5b}$, $P_{6b}$ | $P_{6b}$, $P_{8b}$ | $P_{8b}$, $P_{7b}$ | $P_{7b}$, $P_{1b}$ |
| | Radius | $R_a + R_i$ | $R_S$ | $R_a + R_i$ | $R_i$ | $R_a + R_i$ | $R_i + R_a - R_S$ | $R_a + R_i$ | $R_a$ |
| | Midpoint | $P_{6b}$ | 10 | $P_{7b}$ | 10 | $P_{1b}$ | 10 | $P_{3b}$ | 10 |

TABLE 1-continued

| Profile sections | | | | | | | | | | | |
|---|---|---|---|---|---|---|---|---|---|---|---|
| | | Parameter specification to the circular arcs of the profile sections | | | | | | | | | |
| VI-VI | Endpoints | $P_{1c}, P_{2c}$ | $P_{2c}, P_{3c}$ | $P_{3c}, P_{4c}$ | $P_{4c}, P_{5c}$ | $P_{5c}, P_{6c}$ | $P_{6c}, P_{9c}$ | $P_{9c}, P_{8c}$ | $P_{8c}, P_{7c}$ | $P_{7c}, P_{1c}$ | |
| | Radius | $R_a + R_i$ | $R_S$ | $R_a + R_i$ | $R_i$ | $R_a + R_i$ | $R_a + R_i$ | $R_i + R_a - R_S$ | $R_a + R_i$ | $R_a$ | |
| | Midpoint | $P_{6c}$ | 10 | $P_{7c}$ | 10 | $P_{1c}$ | $P_{2c}$ | 10 | $P_{3c}$ | 10 | |
| VII-VII | Endpoints | $P_{1d}, P_{2d}$ | $P_{2d}, P_{3d}$ | $P_{3d}, P_{6d}$ | $P_{6d}, P_{9d}$ | $P_{9d}, P_{8d}$ | $P_{8d}, P_{1d}$ | | | | |
| | Radius | $R_a + R_i$ | $R_S$ | $R_a + R_i$ | $R_a + R_i$ | $R_i + R_a - R_S$ | $R_a + R_i$ | | | | |
| | Midpoint | $P_{6d}$ | 10 | $P_{1d}$ | $P_{2d}$ | 10 | $P_{3d}$ | | | | |
| VIII-VIII | Endpoints | $P_{1e}, P_{11e}$ | $P_{11e}, P_{12e}$ | $P_{12e}, P_{2e}$ | $P_{2e}, P_{3e}$ | $P_{3e}, P_{6e}$ | $P_{6e}, P_{10e}$ | $P_{10e}, P_{9e}$ | $P_{9e}, P_{8e}$ | $P_{8e}, P_{1e}$ | |
| | Radius | $R_a + R_i$ | $R_i$ | $R_a + R_i$ | $R_S$ | $R_a + R_i$ | $R_a$ | $R_a + R_i$ | $R_i + R_a - R_S$ | $R_a + R_i$ | |
| | Midpoint | $P_{6e}$ | 10 | $P_{10e}$ | 10 | $P_{1e}$ | 10 | $P_{2e}$ | 10 | $P_{3e}$ | |
| IX-IX | Endpoints | $P_{1f}, P_{11f}$ | $P_{11f}, P_{12f}$ | $P_{12f}, P_{2f}$ | $P_{2f}, P_{3f}$ | $P_{3f}, P_{6f}$ | $P_{6f}, P_{10f}$ | $P_{10f}, P_{9f}$ | $P_{9f}, P_{1f}$ | | |
| | Radius | $R_a + R_i$ | $R_i$ | $R_a + R_i$ | $R_S$ | $R_a + R_i$ | $R_a$ | $R_a + R_i$ | $R_i + R_a - R_S$ | | |
| | Midpoint | $P_{6f}$ | 10 | $P_{10f}$ | 10 | $P_{1f}$ | 10 | $P_2 f$ | 10 | | |
| X-X | Endpoints | $P_{1g}, P_{11g}$ | $P_{11g}, P_{12f}$ | $P_{12g}, P_{2g}$ | $P_{2g}, P_{6g}$ | $P_{6g}, P_{10g}$ | $P_{10g}, P_{1g}$ | | | | |
| | Radius | $R_a + R_i$ | $R_i$ | $R_a + R_i$ | $R_a + R_i$ | $R_a$ | $R_a + R_i$ | | | | |
| | Midpoint | $P_{6g}$ | 10 | $P_{10g}$ | $P_{1g}$ | 10 | $P_{2g}$ | | | | |

TABLE 2

| Profile section | Start limiting angle | End limiting angle |
|---|---|---|
| a | $\delta = 0°$ | $\delta = 0°$ |
| Section IV-IV | $\beta = \arccos\left(\dfrac{Ra^2 + Rs^2 - (Ri + Ra)^2}{2RaRs}\right) \cdot \arccos\left(1 - \dfrac{(Ri + Ra)^2}{2Ra^2}\right)$ | $\beta = 180° \cdot \arccos\left(\dfrac{(Ri + Ra)^2 - Ra^2 - (Ri + Ra - Rs)^2}{-2Ra(Ri + Ra - Rs)}\right)$ |
| b | $\delta = 0°$ | $\delta = \delta_{Soll}$ |
| Section V-V | $\beta = 180° \cdot \arccos\left(\dfrac{(Ri + Ra)^2 - Ra^2 - (Ri + Ra - Rs)^2}{-2Ra(Ri + Ra - Rs)}\right)$ | $\beta = 180° \cdot \arccos\left(\dfrac{(Ri + Ra)^2 - Ra^2 - (Ri + Ra - Rs)^2}{-2Ra(Ri + Ra - Rs)}\right) + \delta_{Soll}$ |
| c | $\delta = \delta_{Soll}$ | $\delta = \delta_{Soll}$ |
| Section VI-VI | $\beta = 180° \cdot \arccos\left(\dfrac{(Ri + Ra)^2 - Ra^2 - (Ri + Ra - Rs)^2}{-2Ra(Ri + Ra - Rs)}\right) + \delta_{Soll}$ | $\beta = \arccos((Ra^2 + Rs^2 - (Ri + Ra)^2)/(2RaRs))$ |
| d | $\delta = \delta_{Soll}$ | $\delta = \delta_{Soll}$ |
| Section VII-VII | $\beta = \arccos((Ra^2 + Rs^2 - (Ri + Ra)^2)/(2RaRs))$ | $\beta = 360° \cdot \arccos\left(\dfrac{2Ra^2 - (Ri + Ra)^2}{2Ra^2}\right) - \arccos\left(\dfrac{Ra^2 + Rs^2 - (Ri + Ra)^2}{2RaRs}\right) + \delta_{soll}$ |
| e | $\delta = \delta_{Soll}$ | $\delta = \delta_{Soll}$ |
| Section VIII-VIII | $\beta = 360° \cdot \arccos\left(\dfrac{2Ra^2 - (Ri + Ra)^2}{2Ra^2}\right) - \arccos\left(\dfrac{Ra^2 + Rs^2 - (Ri + Ra)^2}{2RaRs}\right) + \delta_{soll}$ | $\beta = 180° \cdot \arccos\left(\dfrac{Ra^2 - (Ri + Ra - Rs)^2 - (Ri + Ra)^2}{2Ra(Ri + Ra - Rs)}\right) - \arccos\left(\dfrac{2Ra^2 - (Ri + Ra)^2}{2Ra^2}\right)$ |
| f | $\delta = \delta_{Soll}$ | $\delta = 0°$ |
| Section IX-IX | $\beta = 180° \cdot \arccos\left(\dfrac{Ra^2 - (Ri + Ra - Rs)^2 - (Ri + Ra)^2}{2Ra(Ri + Ra - Rs)}\right) - \arccos\left(\dfrac{2Ra^2 - (Ri + Ra)^2}{2Ra^2}\right)$ | $\beta = 180° \cdot \arccos\left(\dfrac{Ra^2 - (Ri + Ra - Rs)^2 - (Ri + Ra)^2}{2Ra(Ri + Ra - Rs)}\right) - \arccos\left(\dfrac{2Ra^2 - (Ri + Ra)^2}{2Ra^2}\right)$ |

TABLE 2-continued

| Profile section | Start limiting angle | End limiting angle |
|---|---|---|
| g | $\delta\ 0°$ | $\delta = 0°$ |
| Section X-X | $\beta = 180° \cdot \arccos\left(\dfrac{Ra^2 - (Ri + Ra - Rs)^2 - (Ri + Ra)^2}{2Ra(Ri + Ra - Rs)}\right) - \arccos\left(\dfrac{2Ra^2 - (Ri + Ra)^2}{2Ra^2}\right)$ | $\beta = 360° \cdot \arccos\left(\dfrac{2Ra^2 - (Ri + Ra)^2}{2Ra^2}\right) \cdot \arccos\left(\dfrac{Ra^2 + Rs^2 - (Ri + Ra)^2}{2RaRs}\right) + \arccos\left(1 - \dfrac{(Ri + Ra)^2}{2Ra^2}\right)$ |

What is claimed is:

1. A screw element for multiscrew extruders with co-rotating and intermeshing screw shafts, said screw element having an outer radius and a core radius and being rotatable about a longitudinal axis in a direction of rotation, the outer radius being greater than the core radius, the screw element further having an axial length and front and rear end faces at axial ends thereof, a profile of said screw element in axial cross-section at each of said front and rear end faces has only one screw flight, the screw flight at each of said front and rear end faces having left and right edges defining a flight surface therebetween comprising a section of a cylindrical surface having the outer radius, the profile of said screw element at each of said front and rear end faces having a circular root with the core radius and left and right flanks which join the root to the left and right flight edges, respectively, wherein said flight surface at said front end face comprises a circumferential width that, proceeding from the front end face for a partial length of said axial length along said longitudinal axis, decreases to zero, one of said left and right edges of said flight surface at said front end face meeting a first common edge at said partial length, said first common edge proceeding to said rear end face, wherein a distance of said first common edge from said longitudinal axis first decreases and then increases proceeding from the end of said partial length to said rear end face along said longitudinal axis, said first common edge ending at one of the left and right flight edges of the flight surface at the rear end face that faces the direction of rotation, said flight surface at said rear end face comprises a circumferential width that, proceeding from the rear end face for the partial length along said longitudinal axis, decreases to zero, one of said left and right edges of said flight surface at said rear end face meeting a second common edge at said partial length, said second common edge proceeding to said front end face, wherein a distance of said second common edge from said longitudinal axis first decreases and then increases proceeding from the end of said partial length to said front end face along said longitudinal axis, said first common edge ending at one of the left and right flight edges of the flight surface at the front end face that faces the direction of rotation, and said screw element further defines a shearing flight having a constant shear radius that is greater than the core radius and less than the outer radius, said shear flight proceeding helically in the direction of rotation from one of said right and left flanks at said front end face that faces the direction of rotation to one of the right and left flanks at the rear end face that faces away from the direction of rotation, said shearing flight comprising a middle section and two end sections along an axial length thereof, said middle section having a substantially constant flight width, said end sections comprise transitional sections having a widths which decrease to zero at the front and rear end faces.

2. The screw element of claim 1, wherein the profile of said screw element is designed for close meshing with another screw element.

3. A screw element in claim 2, wherein an additional pitch is superposed on the screw element by cross-sectional twisting over at least a portion of said axial length.

4. The screw element of claim 3, wherein the additional pitch is produced by twisting the cross-section of screw element relative to said front end face in the direction of rotation.

5. The screw element of claim 4, wherein the additional pitch is superposed over the entire axial length of said screw element.

6. The screw element of claim 4, wherein different additional pitches are superposed on a plurality of axial portions of said axial length.

7. The screw element of claim 3, wherein the additional pitch is produced by twisting the cross-section of screw element relative to said front end face in a direction opposing the direction of rotation.

8. The screw element of claim 7, wherein the additional pitch is superposed over the entire axial length of said screw element.

9. The screw element of claim 7, wherein different additional pitches are superposed on a plurality of axial portions of said axial length.

10. The screw element of claim 1, wherein the screw element is for a twin screw extruder.

* * * * *